United States Patent
Pande et al.

(10) Patent No.: US 12,513,197 B2
(45) Date of Patent: Dec. 30, 2025

(54) DCF-DRIVEN ADAPTIVE SECURITY POLICIES

(71) Applicant: Dell Products L.P., Round Rock, TX (US)

(72) Inventors: Pankaj Pande, Carlingford (AU); Stephen J. Todd, North Andover, MA (US)

(73) Assignee: Dell Products L.P., Round Rock, TX (US)

( * ) Notice: Subject to any disclaimer, the term of this patent is extended or adjusted under 35 U.S.C. 154(b) by 84 days.

(21) Appl. No.: 18/638,603

(22) Filed: Apr. 17, 2024

(65) Prior Publication Data

US 2025/0330495 A1    Oct. 23, 2025

(51) Int. Cl.
*H04L 9/40* (2022.01)

(52) U.S. Cl.
CPC .......... *H04L 63/20* (2013.01); *H04L 63/1416* (2013.01)

(58) Field of Classification Search
CPC .. H04L 63/20; H04L 63/1416; G06F 21/6245
USPC .......................................................... 726/1
See application file for complete search history.

(56) References Cited

U.S. PATENT DOCUMENTS

| | | | | |
|---|---|---|---|---|
| 7,996,373 | B1* | 8/2011 | Zoppas | G06F 21/556 |
| | | | | 707/694 |
| 11,122,346 | B1* | 9/2021 | Kumar | H04L 63/0853 |
| 11,438,359 | B2* | 9/2022 | Todd | H04L 63/1433 |
| 11,755,754 | B2* | 9/2023 | Joshi | G06F 16/2456 |
| | | | | 726/26 |
| 11,824,883 | B2* | 11/2023 | Todd | H04L 63/1433 |
| 12,032,696 | B2* | 7/2024 | Todd | G06F 16/1734 |
| 12,095,784 | B2* | 9/2024 | Suarez | H04L 63/1408 |
| 12,306,951 | B2* | 5/2025 | Todd | G06F 21/64 |
| 12,332,872 | B2* | 6/2025 | Reineke | G06F 16/258 |
| 12,373,584 | B2* | 7/2025 | Joshi | G06N 20/00 |
| 2020/0125746 | A1* | 4/2020 | Joshi | G06F 21/6245 |
| 2020/0322348 | A1* | 10/2020 | Kathail | H04L 63/0876 |
| 2021/0124817 | A1* | 4/2021 | Todd | G06F 21/44 |
| 2021/0126935 | A1* | 4/2021 | Todd | H04L 63/1466 |
| 2022/0100858 | A1* | 3/2022 | Todd | G06F 21/57 |
| 2022/0100879 | A1* | 3/2022 | Todd | G06F 16/2379 |
| 2022/0101336 | A1* | 3/2022 | Todd | G06Q 30/018 |
| 2022/0138325 | A1* | 5/2022 | Todd | G06F 21/64 |
| | | | | 726/26 |
| 2023/0113941 | A1* | 4/2023 | Todd | G06F 16/24568 |
| | | | | 707/741 |
| 2023/0267194 | A1* | 8/2023 | Reineke | G06F 21/64 |
| | | | | 726/22 |
| 2023/0367891 | A1* | 11/2023 | Joshi | G06F 21/62 |
| 2023/0396638 | A1* | 12/2023 | Hebbagodi | H04L 63/20 |
| 2024/0259401 | A1* | 8/2024 | Suarez | H04L 63/1416 |
| 2025/0039239 | A1* | 1/2025 | Parla | H04L 63/1425 |

* cited by examiner

*Primary Examiner* — Samson B Lemma
(74) *Attorney, Agent, or Firm* — Workman Nydegger

(57) ABSTRACT

One example method may be performed in the context of a data confidence fabric (DCF) and may include monitoring a data stream handled by a node, obtaining confidence information concerning the node, determining a data confidence score for the node, mapping the data confidence score to a security policy, and applying the security policy to the data stream. The particular security policy applied to a data stream can be varied in real time based on conditions at the node.

14 Claims, 6 Drawing Sheets

DCF-DRIVEN ADAPTIVE SECURITY POLICIES

TECHNOLOGICAL FIELD

Embodiments of this disclosure generally relate to data confidence fabrics (DCF) and associated operations. More particularly, at least some embodiments relate to systems, hardware, software, computer-readable media, and methods, for application of security policies in a DCF based on data confidence information.

BACKGROUND

Current security policies in edge environments are static and not adaptive to the dynamic nature of data confidence levels. For example, in a typical environment, a static security policy applies the same levels of security, based on policy, at every node in a network. As data flows through an ecosystem, the confidence level associated with that data may change due to varying trustworthiness at each node. For example, a failure of specific software on any node in the network, whether through defective software or an attack, may introduce a lack of confidence in the data being handled by that node. However, due to the static nature of the security policy being applied in the system, a node downstream of the node that experienced the defect or the attack is unaware of the defect or attack. Correspondingly, the downstream node is also unaware of any associated impacts to the data passed along by the node that was attacked or had the defective software. That is, there is no mechanism to provide any assurance or awareness to a downstream node concerning the problem. Thus, compromised data may be spread throughout the DCF without any entity being aware of a problem.

BRIEF DESCRIPTION OF THE DRAWINGS

In order to describe the manner in which at least some of the advantages and features of one or more embodiments may be obtained, a more particular description of some embodiments will be rendered by reference to specific example embodiments thereof which are illustrated in the appended drawings. Understanding that these drawings depict only typical embodiments and are not therefore to be considered to be limiting of its scope, embodiments in this disclosure will be described and explained with additional specificity and detail through the use of the accompanying drawings.

DETAILED DESCRIPTION OF SOME EXAMPLE EMBODIMENTS

Figure 1:
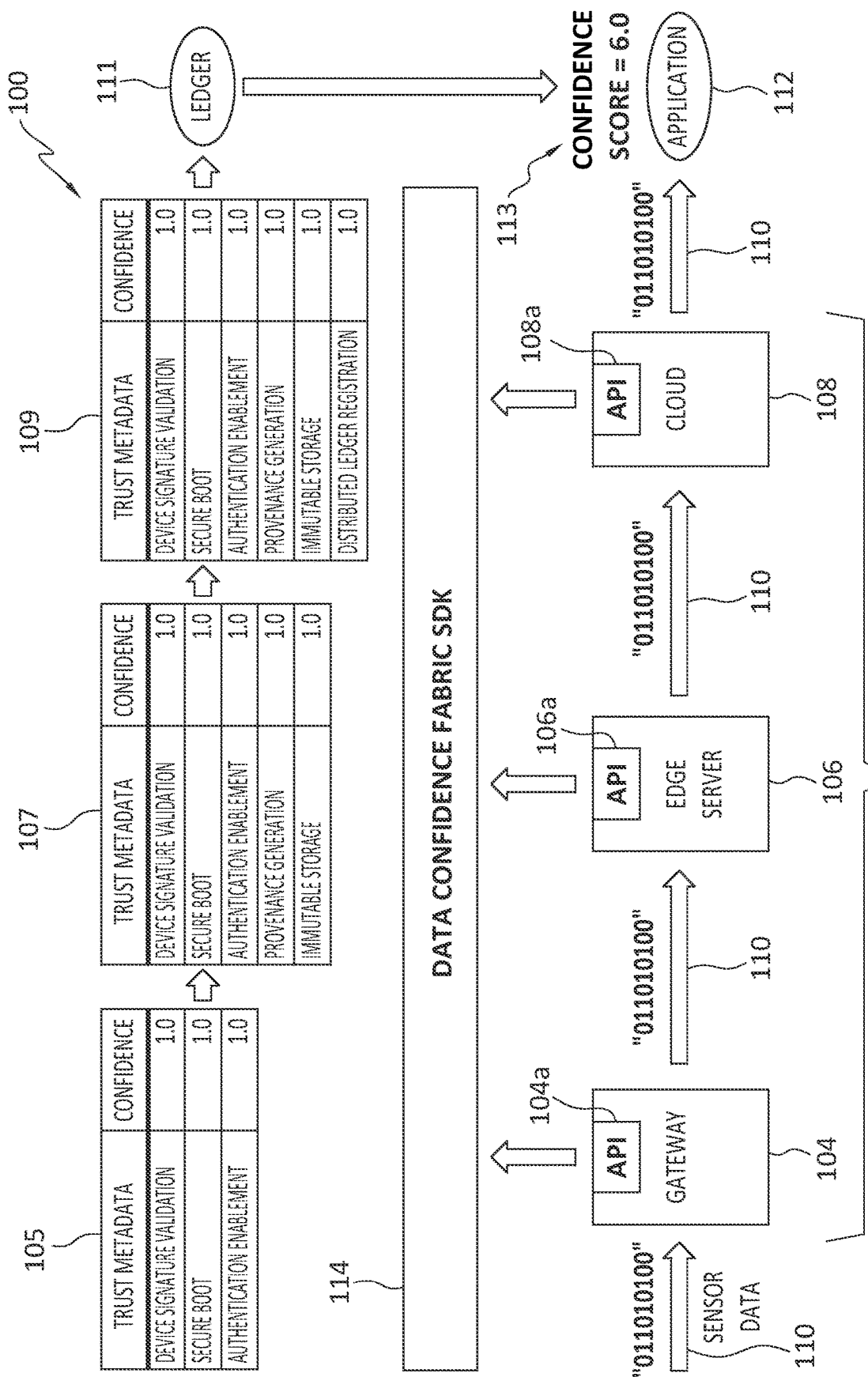
FIG. 1 discloses aspects of a data confidence fabric, in which one or more embodiments may be implemented.

Embodiments of this disclosure generally relate to data confidence fabrics (DCF) and associated operations. More particularly, at least some embodiments relate to systems, hardware, software, computer-readable media, and methods, for application of security policies in a DCF based on data confidence information.

In general, one or more embodiments comprise a method for the use, in a DCF for example, of a dynamically adaptable security policy that is responsive to changing confidence conditions and assessments in the DCF. One embodiment of such a method may comprise operations including: monitoring a data stream as the data stream is processed by a node of a DCF; fetching confidence information concerning that node; determining a data confidence level associated with the data stream and/or the processing node; and applying a security policy to the data stream based on the determining.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of this disclosure in any way. It should further be noted that nothing herein should be construed as constituting an essential or indispensable element of any claim or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that application of a security policy may be performed dynamically based on changing conditions in an environment such as a DCF. An embodiment may provide a level of assurance to nodes in a DCF as to data received from other nodes of the DCF. An embodiment may improve the integrity of an environment such as a DCF, relative to circumstances in which a static security policy is employed. Various other advantages of one or more example embodiments will be apparent from this disclosure.

A. Aspects of an Example Architecture and Environment

The following is a discussion of aspects of example operating environments for various embodiments. This discussion is not intended to limit the scope of the disclosure or claims, or the applicability of the embodiments, in any way.

In general, embodiments may be implemented in connection with systems, software, and components, that individually and/or collectively form computing environments, such as edge computing environments for example. One or more embodiments may be employed in computing environments that comprise, or implement, a portion of a data confidence fabric (DCF).

Note that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

In general, a DCF may include various nodes, which may comprise hardware and/or software, through which the data passes as the data moves through the DCF. Trust information, and confidence information, concerning the data may be inserted at one or more of these nodes as the data transits the DCF. The trust information may indicate, for example, a relative extent to which the data may be considered trustworthy by a user of the data, such as an application for example. The confidence information may indicate a relative level of confidence in the trustworthiness of the data.

Thus, if data passes through a node that is considered untrustworthy for some reason, the confidence in the integrity and reliability of that data may be relatively low. That is, the trust information may be a function of, for example, the nature and operation of the node(s) through which the data passes. To illustrate, if a node that handles the data is determined to have inadequate security controls, data that has passed through that node may be assessed as relatively untrustworthy and the confidence in that data may be correspondingly low. Thus, an application that may have a need for the data may consider the confidence level, or confidence score, of the data in determining whether or not to use that data.

Turning now to FIG. 1, details are provided concerning an example DCF Annotation and Scoring Framework, or simply DCF, 100 in connection with which an embodiment may be employed. As shown, the DCF 100 may include various nodes 102, examples of which may include a gateway 104, an edge server 106, and a cloud site 108, through which data 110 may pass. The data 110 may ultimately be used, or consumed, by an end user 112, such as an application for example.

In an embodiment, the data 110 may be generated by a node such as a sensor, which may comprise an IoT (Internet of Things) edge device for example. Each of the nodes 102 may comprise a respective API 104a, 106a, and 108a, that the nodes 102 may use to communicate confidence information to a DCF SDK (software development kit) 112.

Consider, in the example of FIG. 1, the layers of trust that may be provided in the DCF 100. Particularly, the gateway 104 may have an embedded Intel TPM chip and it may use that chip to perform "trust services" on behalf of the owner of the data 110. In the example above, a "secure boot" annotation, in the trust metadata 105 for the gateway 104, may indicate that the gateway 104 has not been tampered with. The TPM chip may also provide keys used to perform signature services on the data 110. As well, in the example of FIG. 1, the edge server 106 may leverage an ARM secure enclave to perform a "trust service," inspecting the data 110 and performing analytics on it. Finally, a cloud application, such as the Dell Streaming Data Platform running at the cloud site 108, may perform additional trust services on the data 110 such as, for example, inspect the data 110 for drift, as may be done if the data is coming from a sensor with a well-known range of values and/or a long history of stable behavior.

As further indicated in FIG. 1, trust metadata generated at each state of the data 110 journey may be added to trust metadata generated at upstream nodes. Thus, for example, the trust metadata 105 may have been generated at the gateway 104, and the trust metadata 107 may include both the trust metadata 105 and trust metadata generated at the edge server 106. Finally, the trust metadata 109 may include trust metadata generated at the cloud site 108, as well as the trust metadata generated at the edge server 106, and at the gateway 104.

The accumulated trust metadata 109 may be stored in an immutable ledger 111 that may be accessible by the application 112. Additionally, or alternatively, a confidence score 113 may be generated based on the trust metadata 109, and made available to the application 112 or other data 110 end user(s).

The recipient, that is, the data owner, of these trust services that insert trust metadata may require this level of trust insertion in order that their applications, such as the application 112 for example, can produce insights from the data 110 with confidence that the data 110 is trustworthy. The trust insertion functionality may be of great value because it may significantly reduce the risk of dangerous actuation or other business logic resulting from low-quality, erroneous, or malicious data. Trust services may also significantly reduce the risk of regulatory compliance violations. Preventing these violations may enable trust service recipients to avoid regulatory fines. One or more embodiments may enable the vendors providing these trust/confidence services to accurately track the provision of these services in a DCF, and an embodiment may also enable the vendor to bill the data owner, and/or other trust service consumers. Details concerning some example functionalities that may be provided by an embodiment are set forth in the following section.

B. Context for an Embodiment

Figure 2:
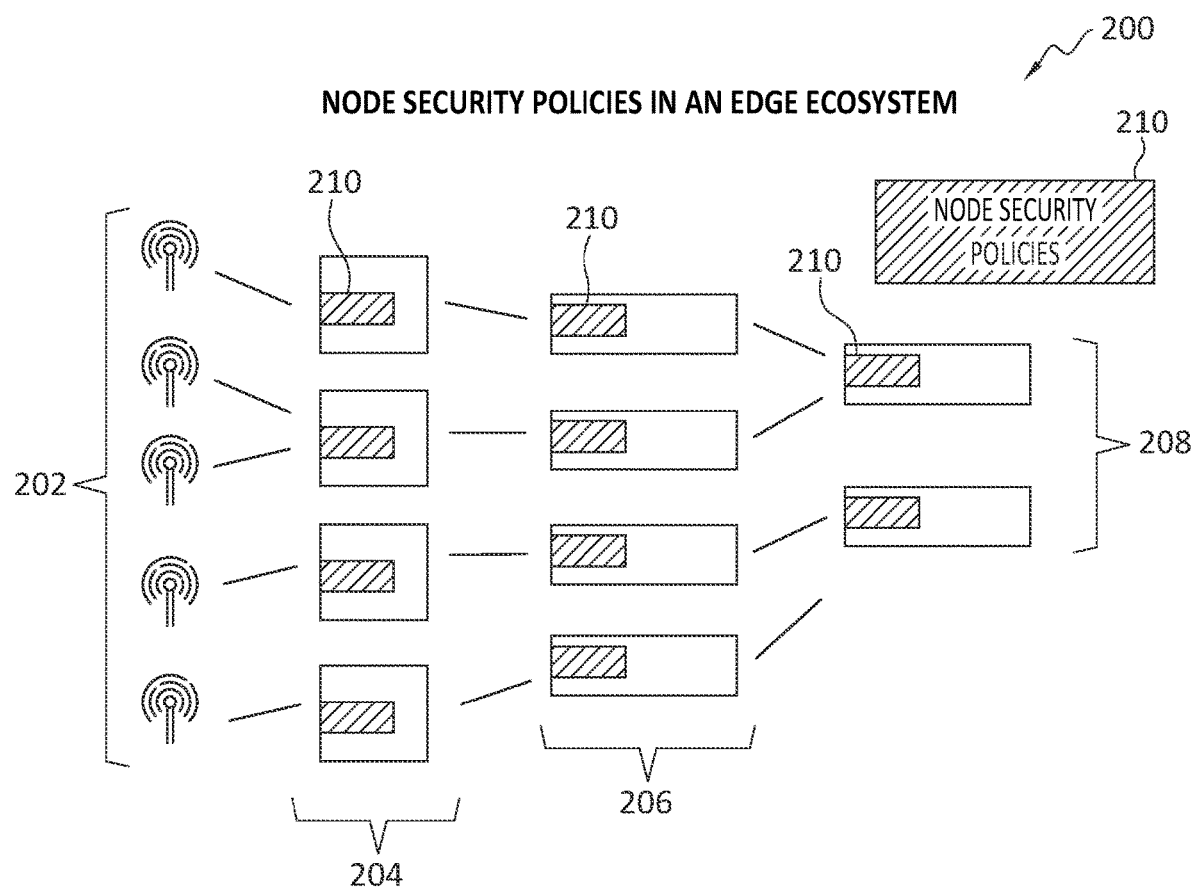
FIG. 2 discloses aspects of a hypothetical example of a way in which a static security policy may be implemented.

With reference now to FIG. 2, a comparative hypothetical example is shown that comprises an architecture 200, which may comprise a portion of a DCF, may have a multi-level structure that comprises various edge devices 202 that communicated with gateways 204. The gateways 204 may, in turn, communicate with various edge servers 206 that communicate with one or more cloud sites 208. Node security policies 210 may be in force, and/or enforced at, one or more levels of the architecture 200. The security policies 210 may be static in nature and not able to adapt to the dynamic nature of data confidence levels, that is, changes to the level of confidence in data traversing the architecture 200. Thus, the security policies 210 may apply the same levels of security at every node and level in the architecture 200.

Figure 3:
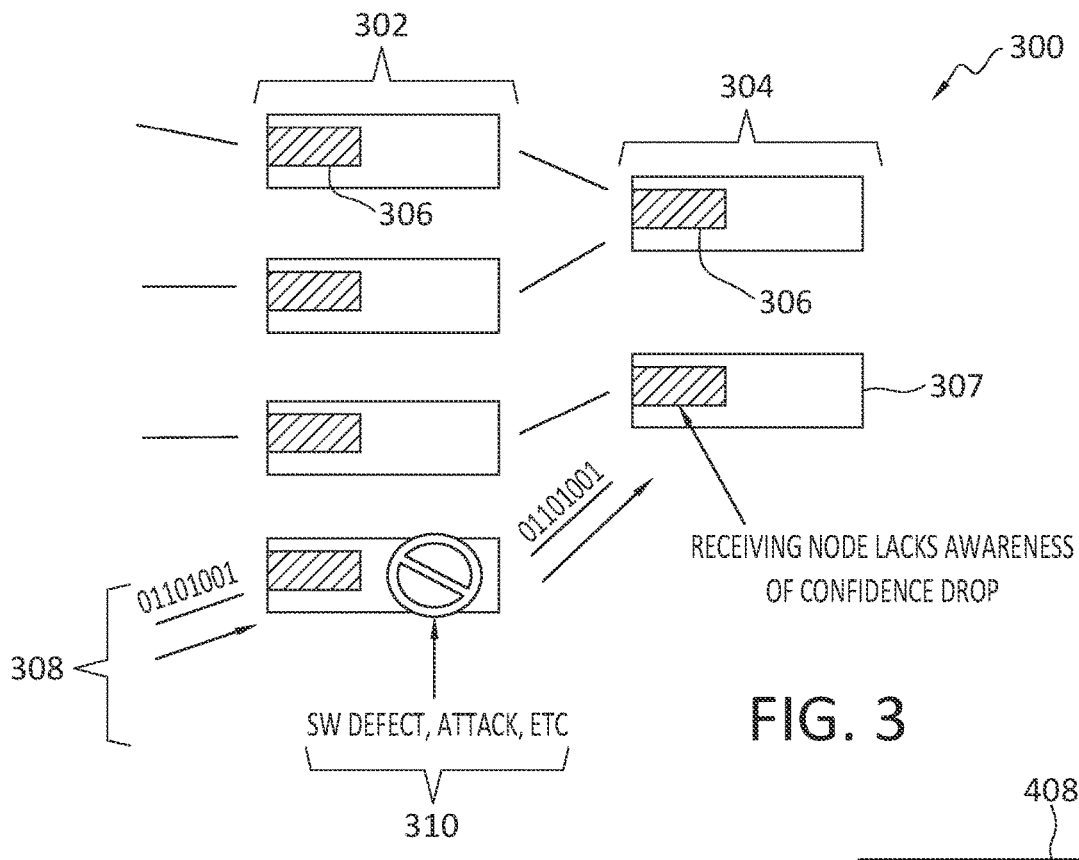
FIG. 3 discloses an example of how a downstream node may be affected by the implementation of a static security policy.

Turning next to FIG. 3, another comparative hypothetical example is shown that comprises an architecture 300, which may comprise a portion of a DCF, and comprise various nodes 302 and 304. Each of the nodes 302 and 304 may be associated with the same set of static security policies 306.

As data 308 flows through the architecture 300, a confidence level associated with that data 308 may change due to variations in trustworthiness at each node 302 and 304. For example, and as illustrated in FIG. 3, a problem, such as a failure 310 of specific software on any node 302 or 304 in the architecture 300, whether because the software is defective, or has been attacked, may introduce a lack of confidence, or at least a reduction in the confidence, in the data 308 being handled by that node 302 where the problem occurred.

FIG. 3 also discloses that a node 307 downstream of the node where the problem occurred may lack awareness that the confidence level of the data 308 has changed. That is, the node 307 is not 'failure aware.' The node 307 may also lack awareness that the failure 310 has occurred at all. Thus, for any downstream nodes in the architecture 300, there is no way to accommodate, in terms of the security policies 306, the confidence downgrade concerning the data 308. That is, there is no ability to provide dynamic levels of security based on this reduced confidence in the data 308.

C. Detailed Description of Aspects of One Embodiment

Figure 4:
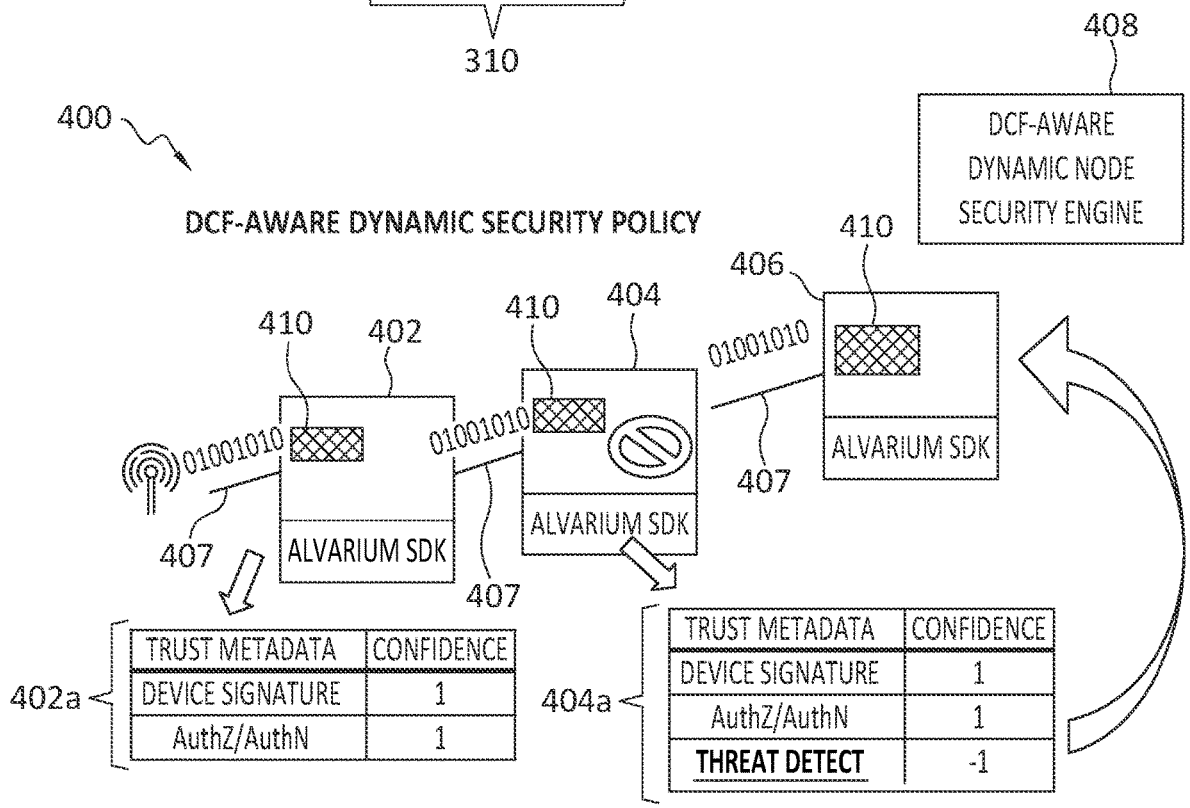
FIG. 4 discloses an example of a DCF-aware dynamic node security engine, and its used, according to one embodiment.

With attention now to the example of FIG. 4, details are provided concerning aspects of an embodiment. In FIG. 4, an architecture 400 is disclosed that may comprise various nodes 402, 404, and 406, that may be configured to communicate with each other and pass data and metadata to each other. Each of the nodes 402, 404, and 406, may perform respective operations concerning data 407 that is transiting the architecture 400. Performance of those operations may cause a confidence score of the data 407 to be increased or decreased. Some example operations, and associated confidence scores for the nodes 402 and 404 are disclosed at 402*a* and 404*a*, respectively. As indicated at 404*a*, the detection of a threat at the node 404 cases a reduction of −1 in the total confidence score applied to data 407 leaving the node 404.

The example architecture 400 may further include a DCF-aware adaptive security policy engine, or simply 'policy engine,' 408 that may operate to implement security measures in real-time, as problems are discovered, based on data confidence scores. In one embodiment, the policy engine 408 may be hosted at a central platform accessible by the nodes 402, 404, and 406. Additionally, or alternatively, respective instances 410 of a policy engine may be deployed at each of the nodes 402, 404, and 406.

In general, the policy engine 408 may monitor data 407 streams and their associated confidence scores, then apply security policies depending on confidence score thresholds defined by the user. In an embodiment, data confidence scores and corresponding security policies may be defined by a user. Application of the security policies may, for example, ensure that only data with acceptable confidence levels are acted upon, for example by a consumer of the data, such as an application.

Figure 5:
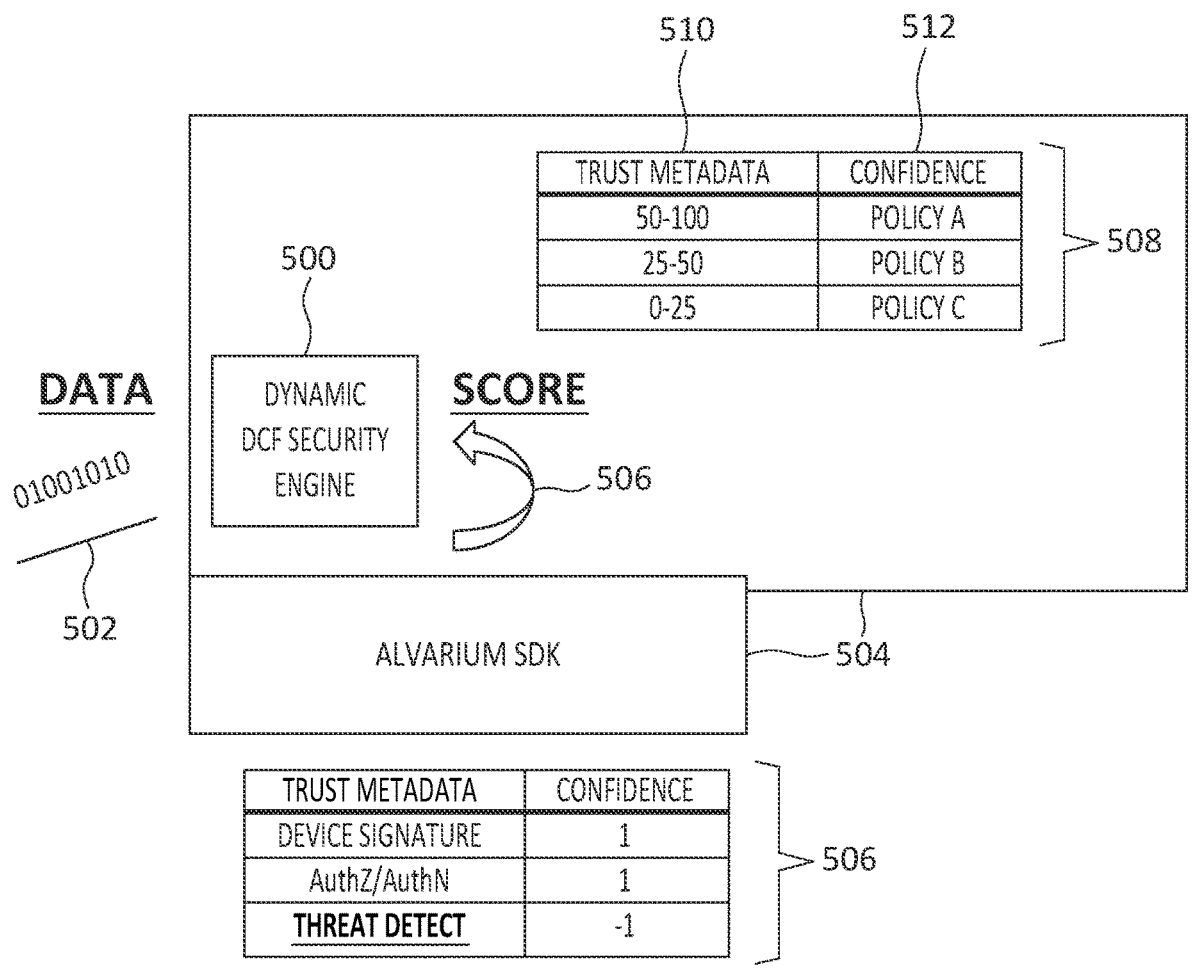
FIG. 5 discloses some operational aspects of the DCF-aware dynamic node security engine of FIG. 4, according to one embodiment.

In more detail, and with reference now to the example of FIG. 5, a policy engine 500, or respective instances of the policy engine 500, may monitor streams of data 502 as they are processed by each DCF node 504. As part of the monitoring, the policy engine 500 may fetches the current confidence scores and other confidence information, collectively shown at 506, that a DCF is using to track data confidence as the data 502 transits the DCF. With the confidence scores/information 506 at hand, the policy engine 500 may then make decisions, based on confidence levels, as to which different security techniques and policies should be applied to which data 502.

In the example of FIG. 5, a map 508 may be employed that maps confidence score thresholds 510 to corresponding security policies 512. In an embodiment, data 506 that meets or exceeds defined confidence score thresholds 510 may have corresponding security policies 512 applied to them. As well, data 506 that fails to meet defined confidence score thresholds 510 may have other security policies 512 applied to them. By way of illustration, data 506 that fails to meet a particular confidence score threshold 510 may trigger the application of additional security measures specified in one of the security policies 512, where such security measures may comprise, for example, increased encryption or restricted access to sensitive actions. As another example, an application may be prevented from consuming data that does not meet a confidence score threshold 510. In another example, data that does not meet a confidence score threshold 510 may be stored in a vault.

In addition, or as an alternative, to real time monitoring of data, a policy engine 500 may perform trend analyses to identify increases and/or decreased in confidence over time. These trends may also correspond to respective security policies 512. In one embodiment, the trend analyses may be performed after the fact, that is, after the data 506 has already passed through a portion of a DCF.

D. Further Discussion

As will be apparent from this disclosure, example embodiments may possess various useful features and aspects, although no embodiment is required to possess any of such features and aspects. The following examples are illustrative, but not exhaustive.

An embodiment may define, implement, and operate, an adaptive security policy engine that adjusts security polices in real-time based on data confidence scores. As another example, an embodiment may combine aspects of a DCF with security policy mechanisms to provide a flexible and scalable solution to security that may be implemented in edge environments, among others.

E. Aspects of One Example Use Case

Following are details regarding an example use case for an embodiment. This use case is for the purposes of illustration, and is not to be taken as limiting the scope of this disclosure, or any claims, in any way.

In this example use case, a smart city application is provided that includes a diverse range of IoT (Internet of Things) devices, including traffic sensors, weather monitors, and security cameras. Each device generates data to which various different confidence levels have been, and are being, assigned. The adaptive security policy engine ensures that only data from trusted and properly functioning devices is acted upon and used in decision-making processes.

For example, consider the contrast between an ambulance that has to get to a hospital as quickly as possible, and normal traffic that does not have such urgency. In this scenario, high confidence sensors, such as ones whose data is known to be reliable and safe from compromised, may be used to generate routes and decision for ambulance routes for ML (machine learning) predictions, while lower confidence sensors may still be utilized to generate predictions, such as traffic routes, for normal traffic. If a traffic light, for example, has defective software or been under attack, a routing application can decide, based on the data confidence information, not to send the ambulance through that "low-confidence" light.

F. Example Methods

Figure 6:
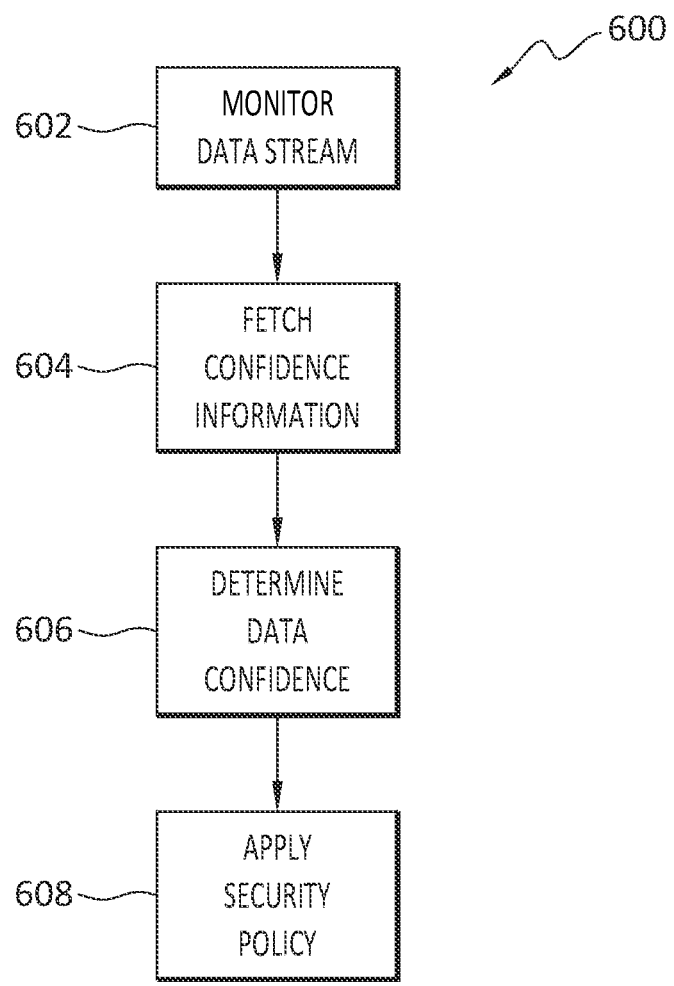
FIG. 6 discloses aspects of an example method according to one embodiment.

It is noted with respect to the disclosed methods, including the example method of FIG. 6, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 6, a method according to one example embodiment is generally indicated at 600. In one embodiment, the method 600 may be performed by policy engine application hosted at a platform and/or by an instance of policy engine running at a node of a DCF.

The method 600 may begin with the monitoring 602, by a policy engine implementation, of data passing into, and/or out of, a node of a DCF. The monitoring 602 may be performed on an ongoing basis, ad hoc, at defined points in time, or any combination of these. The policy engine implementation may then fetch 604 confidence information concerning the data. The confidence information may be stored on a node basis, for example, so that the policy engine can identify the node associated with the data that is being monitored 602, and then fetch 604 the corresponding confidence information associated with that node.

In an embodiment, the confidence information may be generated by the node through which the data is passing. In an embodiment, the confidence information may reside at the monitored node(s) and/or at a central repository. In an embodiment, one or more nodes may report incidents or problems, such as may affect data confidence, to the policy engine implementation. This reporting may be performed on the initiative of the node, and/or in response to a query, such as from the policy engine implementation.

After the confidence information has been fetched 604, the policy engine implementation may then determine 606 a data confidence score of the data associated with the node, or nodes, in question. In an embodiment, determination 606 of the data confidence score may comprise summing the data confidence values of the node whose data stream is being monitored.

When the data confidence score has been determined 606, the policy engine implementation may then map the data confidence score to a corresponding security policy, and apply 608 the security policy. In an embodiment, the security policy specifies how the data, to which the data confidence score applies, should be handled by any node(s) downstream of the node associated with that data confidence score.

If, or when, a change occurs at the node that affects the confidence information, the security policy may be dynamically changed to another security policy that corresponds to the data confidence score generated based on the altered confidence information. In this way, different security policies may be dynamically, and automatically, applied at different times to one or more node(s) and/or data, based on changing conditions, at one or more of the nodes, that affect data confidence.

G. Further Example Embodiments

Following are some further example embodiments. These are presented only by way of example and are not intended to limit the scope of this disclosure, or the claims, in any way.

Embodiment 1. A method, comprising: monitoring a data stream handled by a node; obtaining confidence information concerning the node; determining a data confidence score for the node; mapping the data confidence score to a security policy; and applying the security policy to the data stream.

Embodiment 2. The method as recited in any preceding embodiment, wherein the data confidence score is mapped to the security policy based on whether or not the data confidence score meets or exceeds a defined threshold.

Embodiment 3. The method as recited in any preceding embodiment, wherein when a change occurs at the node that changes the data confidence score, a different security policy that corresponds to the data confidence score is automatically applied to the data stream.

Embodiment 4. The method as recited in any preceding embodiment, wherein the confidence information is indicative of an attack, or software problem, having occurred at the node.

Embodiment 5. The method as recited in any preceding embodiment, wherein the node comprises an edge device in a data confidence fabric.

Embodiment 6. The method as recited in any preceding embodiment, wherein application of the security policy causes a downstream node, that receives the data stream from the node, to handle the data stream as specified by the security policy.

Embodiment 7. The method as recited in any preceding embodiment, wherein when a change occurs at the node that changes the data confidence score, a different security policy that corresponds to the data confidence score is applied in real time to the data stream.

Embodiment 8. The method as recited in any preceding embodiment, wherein a trend in the data confidence score is used as a basis to apply another security policy.

Embodiment 9. The method as recited in any preceding embodiment, wherein multiple different data streams from other respective nodes are monitored.

Embodiment 10. The method as recited in any preceding embodiment, wherein the monitoring is performed at the node and/or at a site remote from the node.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of the disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 7:
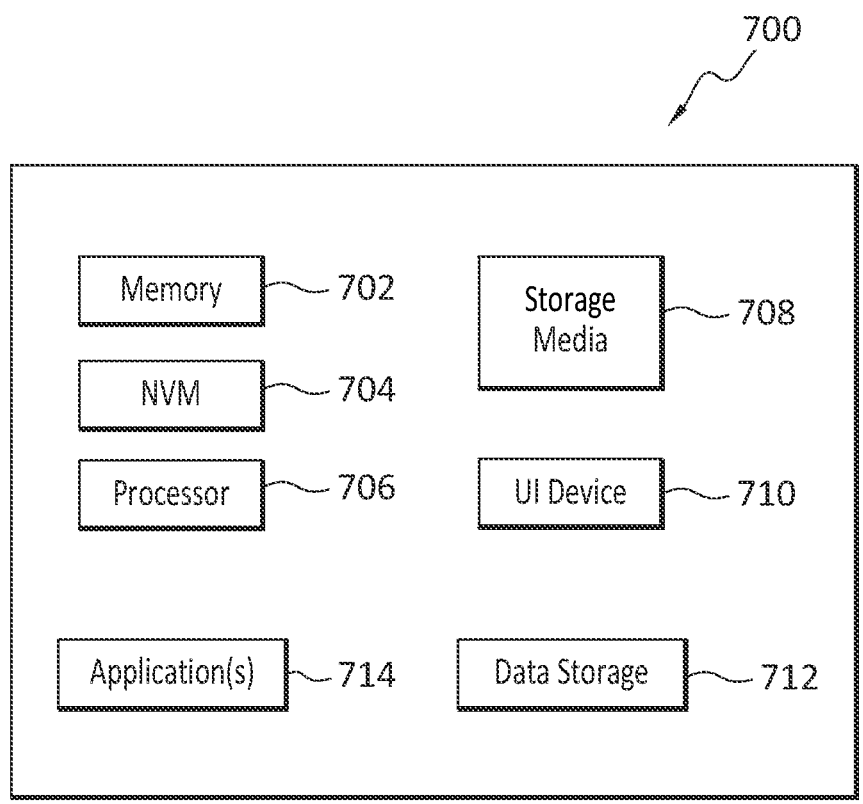
FIG. 7 discloses an example computing entity configured and operable to perform any of the disclosed methods, processes, and operations.

With reference briefly now to FIG. 7, any one or more of the entities disclosed, or implied, by FIGS. 1-6, and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A computer implemented method implemented using one or more hardware processors, the method comprising: monitoring a data stream handled by a node; obtaining confidence information concerning the node; determining a data confidence score for the node; mapping the data confidence score to a security policy; applying the security policy to the data stream; wherein the data confidence score is mapped to the security policy based on whether or not the data confidence score meets or exceeds a defined threshold; wherein the application of the security policy causes a downstream node, that receives the data stream from the node, to handle the data stream as specified by the security policy; and wherein when a change occurs at the node that changes the data confidence score, a different security policy that corresponds to the data confidence score is applied in real time to the data stream.

2. The method as recited in claim 1, wherein when a change occurs at the node that changes the data confidence score, a different security policy that corresponds to the data confidence score is automatically applied to the data stream.

3. The method as recited in claim 1, wherein the confidence information is indicative of an attack, or software problem, having occurred at the node.

4. The method as recited in claim 1, wherein the node comprises an edge device in a data confidence fabric.

5. The method as recited in claim 1, wherein a trend in the data confidence score is used as a basis to apply another security policy.

6. The method as recited in claim 1, wherein multiple different data streams from other respective nodes are monitored.

7. The method as recited in claim 1, wherein the monitoring is performed at the node and/or at a site remote from the node.

8. A non-transitory storage medium having stored therein instructions that are executable by one or more hardware processors to perform operations comprising: monitoring a data stream handled by a node; obtaining confidence information concerning the node; determining a data confidence score for the node; mapping the data confidence score to a security policy; applying the security policy to the data stream; wherein the data confidence score is mapped to the security policy based on whether or not the data confidence score meets or exceeds a defined threshold; wherein the application of the security policy causes a downstream node, that receives the data stream from the node, to handle the data stream as specified by the security policy; and wherein when a change occurs at the node that changes the data confidence score, a different security policy that corresponds to the data confidence score is applied in real time to the data stream.

9. The non-transitory storage medium as recited in claim 8, wherein when a change occurs at the node that changes the data confidence score, a different security policy that corresponds to the data confidence score is automatically applied to the data stream.

10. The non-transitory storage medium as recited in claim 8, wherein the confidence information is indicative of an attack, or software problem, having occurred at the node.

11. The non-transitory storage medium as recited in claim 8, wherein the node comprises an edge device in a data confidence fabric.

12. The non-transitory storage medium as recited in claim 8, wherein a trend in the data confidence score is used as a basis to apply another security policy.

13. The non-transitory storage medium as recited in claim 8, wherein multiple different data streams from other respective nodes are monitored.

14. The non-transitory storage medium as recited in claim 8, wherein the monitoring is performed at the node and/or at a site remote from the node.

* * * * *